US012770405B2

(12) United States Patent
Padiri

(10) Patent No.: US 12,770,405 B2
(45) Date of Patent: Oct. 20, 2026

(54) COMPUTER-IMPLEMENTED METHOD FOR REDUCING FALSE POSITIVES IN A COMPUTER VISION TASK AND APPLICATION THEREOF TO MOTOR VEHICLE EXTERIOR MONITORING

(71) Applicant: Continental Autonomous Mobility Germany GmbH, Ingolstadt (DE)

(72) Inventor: Bhanu Prakash Padiri, Bangalore (IN)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 348 days.

(21) Appl. No.: 18/526,383

(22) Filed: Dec. 1, 2023

(65) Prior Publication Data

US 2024/0257533 A1 Aug. 1, 2024

(30) Foreign Application Priority Data

Dec. 1, 2022 (GB) ..................................... 2218045

(51) Int. Cl.
*G06V 20/58* (2022.01)
*G06V 10/75* (2022.01)
(Continued)

(52) U.S. Cl.
CPC ............ *G06V 20/58* (2022.01); *G06V 10/751* (2022.01); *G06V 10/776* (2022.01); *G06V 20/70* (2022.01)

(58) Field of Classification Search
CPC ............. G06V 20/58; G06V 10/25506; G06V 10/776; G06V 10/98; G06F 18/217; G06T 2207/30252
See application file for complete search history.

(56) References Cited

U.S. PATENT DOCUMENTS 7,102,496 B1 9/2006 Ernst, Jr. et al.
9,555,740 B1 1/2017 Zhu et al.
(Continued)

FOREIGN PATENT DOCUMENTS

DE 102021101270 A1 * 7/2021 ............ B60W 50/00
DE 112020001663 T5 * 3/2022 ............... G06N 7/01
(Continued)

OTHER PUBLICATIONS

S. Zakharov, B. Planche, Z. Wu, A. Hutter, H. Kosch and S. Ilic, "Keep it Unreal: Bridging the Realism Gap for 2.5D Recognition with Geometry Priors Only," 2018 International Conference on 3D Vision (3DV), Verona, Italy, 2018, pp. 1-11, doi: 10.1109/3DV.2018.00012 (Year: 2018).*
(Continued)

*Primary Examiner* — Michael Robert Cammarata
(74) *Attorney, Agent, or Firm* — Fitch, Even, Tabin & Flannery LLP

(57) ABSTRACT

A method and system for improving real-time false positive reduction, in which first and second sensor data of a potential object in a common portion of an environment of a motor vehicle are compared. Upon determining that there is a discrepancy in the first and second sensor data in relation to the object, an analysis by synthesis is performed on the first sensor data. If the analysis results in a match, then the first sensor data are validated and can be used for generating a control signal for an autonomous vehicle. If the analysis results in a mismatch, the first sensor data are excluded from generating the control signal. In case of no discrepancy between the first and second sensor data, both are used in generating the control signal.

11 Claims, 4 Drawing Sheets

(51) Int. Cl.

| | |
|---|---|
| ***G06V 10/776*** | (2022.01) |
| ***G06V 20/70*** | (2022.01) |

(56) References Cited

U.S. PATENT DOCUMENTS

| | | | | |
|---|---|---|---|---|
| 11,688,198 | B1 * | 6/2023 | Ranjan | G06F 18/213 382/115 |
| 2018/0314921 | A1 | 11/2018 | Mercep et al. | |
| 2020/0074266 | A1 | 3/2020 | Peake et al. | |
| 2021/0117703 | A1 * | 4/2021 | Ohgushi | G06V 10/82 |
| 2021/0390407 | A1 * | 12/2021 | Casser | G06V 10/82 |
| 2021/0406560 | A1 | 12/2021 | Park et al. | |
| 2022/0004818 | A1 * | 1/2022 | Koopman | G06N 3/084 |
| 2022/0012939 | A1 * | 1/2022 | Wang | G06V 20/64 |
| 2022/0067882 | A1 * | 3/2022 | Ohgushi | G06T 5/50 |
| 2022/0101053 | A1 | 3/2022 | Litvak et al. | |
| 2022/0396262 | A1 | 12/2022 | Totzke | |
| 2022/0405578 | A1 * | 12/2022 | Antonides | G06F 18/214 |
| 2024/0112036 | A1 * | 4/2024 | Yoo | G06N 20/00 |
| 2024/0257533 | A1 * | 8/2024 | Padiri | G06V 10/993 |

FOREIGN PATENT DOCUMENTS

| | | | | |
|---|---|---|---|---|
| EP | 3825197 | A1 | 5/2021 | |
| WO | 2019226686 | A2 | 11/2019 | |
| WO | 2021105039 | A1 | 6/2021 | |
| WO | 2021115552 | A1 | 6/2021 | |
| WO | WO-2024081126 | A1 * | 4/2024 | B60W 30/09 |

OTHER PUBLICATIONS

Karjalainen, Antti Ilari, Roshenac Mitchell, and Jose Vazquez. "Training and validation of automatic target recognition systems using generative adversarial networks." 2019 Sensor Signal Processing for Defence Conference (SSPD). IEEE, 2019. (Year: 2019).*

Great Britain Search Report dated Jun. 13, 2023 for the priority Great Britain Patent Application No. 2218045.9.

Zhangjing Wang et al., "Multi-Sensor Fusion in Automated Driving: A Survey", IEEE Access ( vol. 8), pp. 2847-2868, Date of Publication: Dec. 26, 2019, DOI: 10.1109/ACCESS.2019.2962554.

Tobias Koch et al., "Automatic and Semantically-Aware 3D UAV Flight Planning for Image-Based 3D Reconstruction", Remote Sensing, vol. 11, issue 13, p. 1550, Jun. 2019, DOI: 10.3390/RS11131550.

Deter Dean et al. "Simulating the Autonomous Future: A Look at Virtual Vehicle Enviroments and How to Validate Simulation Using Public Data Sets", IEEE Signal Processing Magazine, IEEE, USA, vol. 38, No. 1, Dec. 24, 2020, pp. 111-121, XP011828174; ISSN: 1053-5888, DOI: 10.1109/MSP.2020.2984428.

European Search Report dated Apr. 25, 2024 of counterpart EP application 23187723.4.

European Patent Office, Communication pursuant to Article 94(3) EPC dated Jan. 20, 2026, from related European Patent Application No. 23187723.4, 6 pages.

* cited by examiner

COMPUTER-IMPLEMENTED METHOD FOR REDUCING FALSE POSITIVES IN A COMPUTER VISION TASK AND APPLICATION THEREOF TO MOTOR VEHICLE EXTERIOR MONITORING

CROSS-REFERENCE TO RELATED APPLICATIONS

The present application claims priority from United Kingdom Application No. 2218045.9 filed on Dec. 2, 2022, the content of which is incorporated by reference herein.

BACKGROUND

1. Field

A computer-implemented method for reducing false positives in a computer vision task and application thereof to motor vehicle exterior monitoring.

2. Description of Related Art

Embodiments of the application relate to a computer-implemented method for avoiding or reducing false positives in a computer vision task and application thereof for motor vehicle exterior monitoring.

WO 2021/115 552 A1 discloses a control system for selectively controlling a vehicle, ensuring high integrity of decisions taken by the control system when controlling the vehicle.

WO 2021/105 039 A1 discloses a method for operating a partially autonomous motor vehicle, wherein a driving trajectory running centrally along the lane is shifted to the edge of the lane as a function of lane information, the current speed of the motor vehicle and as a function of current traffic volume in the surroundings of the motor vehicle.

EP 3 825 197 A1 discloses that, when a failure occurs in any of a plurality of controllers installed in a vehicle, an operation function is realized that is equivalent to the operation function that is lost due to the failure without resorting to a redundantly configured control system.

U.S. Pat. No. 9,555,740 B1 discloses methods and systems for cross-validating a second sensor with a first sensor. Cross-validating the second sensor includes obtaining sensor readings from the first sensor and comparing the sensor readings from the first sensor with sensor readings obtained from the second sensor.

U.S. Pat. No. 7,102,496 B1 discloses a sensor system for use in a vehicle that integrates sensor data from more than one sensor in an effort to facilitate collision avoidance and other types of sensor-related processing.

Koch et al. (2019), "Automatic and Semantically-Aware 3D UAV Flight Planning for Image-Based 3D Reconstruction.", Remote Sensing, 11(13), 1550—; doi:10.3390/rs11131550 discloses optimization of flight paths for generating 3D models of scenes. The model is generated by capturing through different flight paths and reconstructing 3D models.

WO 2019/226 686 A1 discloses a machine learning system to enhance various aspects of machine learning models. A substantially photorealistic three-dimensional (3D) graphical model of an object is accessed and a set of training images of the 3D graphical mode are generated. The set of training images is generated to add imperfections and degrade photorealistic quality of the training images. The set of training images are provided as training data to train an artificial neural network.

Wang et al. (2020), "Multi-Sensor Fusion in Automated Driving: A Survey"; IEEE Access, 8( ) 2847-2868. doi: 10.1109/ACCESS.2019.2962554 discloses multi-sensor fusion for automated driving applications.

SUMMARY

Aspects and objects of embodiments of the present application relate to improved computer vision tasks, in particular with respect to reliability, and allow real-time application in vehicle exterior monitoring.

According to an aspect of an embodiment, there is provided a computer-implemented method for avoiding or reducing false positives in a computer vision task, preferably of a motor vehicle, e.g., an at least partially autonomous motor vehicle, the method including: a data pre-processing means that receives first sensor data and object recognition data that were generated based on the first sensor data, wherein the object recognition data is indicative at least of an object type and an object location of an object included in the first sensor data, wherein the object type is defined by at least one semantic descriptor; a data cutting means that cuts the object from the first sensor data to obtain comparative object data that only include the object as defined by the object recognition data; a synthetic data generator means that generates from the at least one semantic descriptor synthetic object data that correspond with the semantic descriptor; and a data evaluation means that compares the comparative object data with the synthetic object data and, if the comparative object data and the synthetic object data are determined to match, generates a confirmation signal that indicates confirmation of the validity object recognition data, or otherwise generates a rejection signal that causes the object recognition data to be rejected from further processing.

Preferably, the data pre-processing means receives second sensor data that were obtained from a different sensor type than the first sensor data. Preferably, the second sensor data includes information about the same portion of an environment around the motor vehicle in which the object is located. Preferably, in step d) the data evaluation means, upon generating the rejection signal, generates a go-ahead signal that causes the second sensor data to be brought to further processing.

Preferably, the data pre-processing means compares the first sensor data and the second sensor data and, preferably only, in the event of determining that there is a mismatch in relation to the object, preferably feeds the first sensor data and the object recognition data to the data cutting means and/or preferably causes subsequent steps to be carried out. Preferably, otherwise the data pre-processing means generates a go-ahead signal that causes skipping of subsequent steps and causes the first sensor data and/or second sensor data to be brought to further processing.

Preferably, the first sensor data include or consist of image data gathered by an imaging sensor apparatus. Preferably, the first sensor data include or consist of non-image data gathered by a non-imaging sensor apparatus.

Preferably, the second sensor data include or consist of non-image data gathered by a non-imaging sensor apparatus. Preferably, the second sensor data include or consist of image data gathered by an imaging sensor apparatus.

According to an aspect of an embodiment, there is provided a method for generating a control signal for a motor vehicle, the method including: a first sensor apparatus that gathers first sensor data and determining object recognition data based on the sensor data, wherein the object recognition data is indicative at least of an object type and an object location of an object included in the first sensor data, wherein the object type is defined by at least one semantic descriptor; a data cutting means that cuts the object from the first sensor data to obtain comparative object data that only include the object as defined by the object recognition data; a synthetic data generator means that generates from the at least one semantic descriptor synthetic object data that correspond with the semantic descriptor; and a data evaluation means that compares the comparative object data with the synthetic object data and, if the comparative object data and the synthetic object data are determined to match, generates a confirmation signal that indicates confirmation of the validity object recognition data, or otherwise generates a rejection signal that causes the object recognition data to be rejected from further processing; a control means that generates a control signal for the motor vehicle in response to receiving the confirmation signal and the object recognition data, wherein the control signal is based on the object recognition data.

Preferably, the control signal causes a change in motion of the motor vehicle, such as acceleration or braking. Preferably, the control signal causes a warning to a driver.

Preferably, the control means generates a control signal in response to receiving the rejection signal, wherein the object recognition data is excluded from generating the control signal.

Preferably, a second sensor apparatus comprises a second sensor that has a different sensor type than a first sensor of the first sensor apparatus, and the second sensor apparatus gathers second sensor data that includes information about the same portion of an environment around the motor vehicle in which the object is located.

Preferably, the data evaluation means, upon generating the rejection signal, generates a go-ahead signal that causes the second sensor data to be brought to further processing.

Preferably, the control means generates the control signal for the motor vehicle based on the second sensor data in response to receiving the rejection signal and the go-ahead signal.

Preferably, a data pre-processing means that compares the first sensor data and the second sensor data and, preferably only, in the event of determining that there is a mismatch in relation to the object, preferably feeds the first sensor data and the object recognition data to the data cutting means and/or preferably causes the subsequent steps to be carried out. Preferably, the data pre-processing means otherwise generates a go-ahead signal that causes skipping of subsequent steps and feeds the first sensor data and/or second sensor data to the control means for further processing.

Preferably, the control signal is additionally based on the first sensor data and/or the second sensor data.

Preferably, the first sensor apparatus is an imaging sensor apparatus that gathers image data as the first sensor data. Preferably, the first sensor apparatus is a non-imaging sensor apparatus that gathers non-image data as the first sensor data.

Preferably, the second sensor apparatus is a non-imaging sensor apparatus that gathers non-image data as the second sensor data. Preferably, the second sensor apparatus is an imaging sensor apparatus that gathers image data as the second sensor data.

According to an aspect of an embodiment, there is provided a data processing apparatus comprising means for carrying out the steps of the method.

According to an aspect of an embodiment, there is provided a motor vehicle comprising a first sensor apparatus and a preferred data processing apparatus. Preferably the motor vehicle comprises a second sensor apparatus.

According to an aspect of an embodiment, there is provided a computer program comprising instructions which, when the program is executed by a data processing apparatus, cause data processing apparatus to carry out a preferred method.

According to an aspect of an embodiment, there is provided a computer-readable medium or data carrier signal comprising a preferred computer program.

A preferably autonomous vehicle can be fitted with different types of sensors, such as front camera, rear camera, and/or surround cameras. Other types of sensors include LIDAR, RADAR, and/or ultrasonics.

The sensors, e.g., ultrasonics can perceive the surroundings, i.e., the environment, of the vehicle in order to do path planning and later take action (brake, accelerate or steer, stop etc.). The sensors, e.g., high resolution cameras (1.5 MPix to more than 8.3 MPix) with different fields of view (FOV, e.g., 45° to more than) 195°, may capture images around the vehicle, that can be processed to do object detection/object recognition.

In some embodiments, the images from other cameras can be stitched together so as to obtain a 360° view around the vehicle. Object detection may be performed later on the combined images.

RADAR sensors with long range and short range capabilities (e.g., 250 m range, ±60° FoV, ±0.2° horizontal/±1° vertical, operating at 66 MHz to 77 MHz etc.) may also be used to detect objects like pedestrians, cyclists, motorbikes, tunnels etc. The detections from RADAR can also be fused with camera detections to improve accuracy and improve confidence.

In some embodiments LIDAR may be used independently or combined with other sensors. There is a risk of false positives that pose a challenge to partially autonomous driving. By using a method called "Analysis by Synthesis", the application can improve on the false positive ratio.

With the disclosed idea the accuracy may be improved, even without fusion of multiple sensors. The approach taken here allows for a reduction in computational power and is hence better amenable to real-time critical applications. Furthermore, the handling of extreme edge/false positive cases can be improved.

The idea addresses challenging situations that may occur during sensor fusions and also during single sensor applications. In this idea, the detections from one sensor may be recreated or synthesized. For example, if the front camera detects a human pedestrian on the road, a 3D object based on the semantics of the detected object (man or contour standing with some height/width etc.) is synthesized.

This synthesized object is then compared with the detected cut out (pedestrian object from camera), by using a different neural network/algorithm. An example for such a neural network also designated comparator network or model are Siamese networks. A Siamese neural network (sometimes called a twin neural network) is an artificial neural network that uses the same weights while working in tandem on two different inputs to determine comparable outputs. A suitable Siamese network is CFnet, for example, that is described in J. Valmadre et al.; Proceedings of the IEEE Conference on Computer Vision and Pattern Recognition (CVPR), 2017, pp. 2805-2813. Further information about CFnet is available at https://www.robots.ox.ac.uk/~luca/cfnet.html.

Another example for a suitable comparator network is StructSiam that is described in Y. Zhang et al.; "Structured Siamese Network for Real-Time Visual Tracking" European Conference on Computer Vision (ECCV), 2018, pp. 355-370.

Image pair generation is a fundamental aspect of siamese networks. A siamese network needs to be able to understand the difference between two images of the same class (positive pairs) and two images from different classes (negative pairs). During the training process the weights of the network can be updated such that it can tell the difference between two images of the same class versus two images of a different class. It is possible to generate positive pairs & negative pairs as implemented in pyhton here: https://pyimagesearch.com/2020/11/23/building-image-pairs-for-siamese-networks-with-python/.

Based on the output of this algorithm, a final decision can be made. This method can be sought, when there is a conflict between sensor outputs.

For example, a camera may detect a pedestrian due to a snow pattern on a road, however, another sensor, e.g., RADAR does not give any detections. Due to the mismatch in the data of the two different sensors, analysis by synthesis is performed on the image data. When the analysis by synthesis also results in the determination that there is no pedestrian, then RADAR output can be confidently taken into consideration and go ahead for further processing.

With this it is possible to reduce the risk of or even avoid false detections. Consequently, the risk for erroneous control signals that may cause false or phantom braking, unnecessary stoppage of the vehicle etc. can be reduced.

Another idea is the resolution of confusion when multi sensor fusion is applied. Issues, such as false detections, can be reduced especially during autonomous driving. With the disclosed idea redundancy can be avoided, which can make the overall system simpler. Also, additional confusion due to redundancy can also be avoided. Especially some edge cases can be resolved that are not resolvable in spite of sensor fusion or redundancy in place.

Due to recreating a scenario of detections, it is possible to check the system with different algorithms, which in turn allows a higher level of confidence. Typical cases that may be resolved by the idea include edge cases at night, shadows, occlusions, blockages etc.

The analysis by synthesis part can be selectively triggered and hence computational effort can be reduced.

The proposed method can be implemented using traditional comparator algorithms or by using machine learning/AI techniques. A light weight AI can be developed in a manner known per se by training images of slightly modified "edge cases" and/or real/synthetic images (generated by GPU based on semantics of objects) and tuning the network with right ground truth information. The training is done in a usual manner by minimizing a predetermined loss function, e.g. a triplet loss function. The triplet loss function is particularly useful for comparator models, such as Siamese networks.

Suitable training datasets include KITTI (available from https://www.cvlibs.net/datasets/kitti/), Omniglot dataset (available from https://github.com/brendenlake/omniglot), LFW dataset (available from http://vis-www.cs.umass.edu/lfw/), Berkeley DeepDrive (available from: https://bdd-data.berkeley.edu/), or nuScenes dataset (available from: https://www.nuscenes.org/nuscenes). It is also possible to use synthetic data sets that are generated by Unity or UnrealEngine, which are available from: https://unity.com/products/computer-vision and https://github.com/unrealgt/UnrealGT, respectively.

Thereby the AI network can differentiate a false positive situation and an actual object. Hence, the risk for false positives can be reduced.

The decision, whether analysis by synthesis is performed may be taken during a pre-processing step. A 3D/2D model is generated on the fly, i.e., in real time, based on semantics of a sensor output. The idea is to trigger the generation only in cases when there is a discrepancy in multi sensors decisions. The generation of the synthetic model may be performed by a generative adversarial network or other model generators known per se.

After the analysis by synthesis was triggered, a comparison is made between the sensor data and the synthesized data. Based on the comparison it is determined with which sensor output (RADAR or CAMERA or LIDAR or any other) the method proceeds further. With this the risk for collisions/accidents or phantom brakings etc. can be reduced.

BRIEF DESCRIPTION OF THE DRAWINGS

Embodiments of the application are described in more detail with reference to the accompanying schematic drawings.

DETAILED DESCRIPTION

Figure 1:
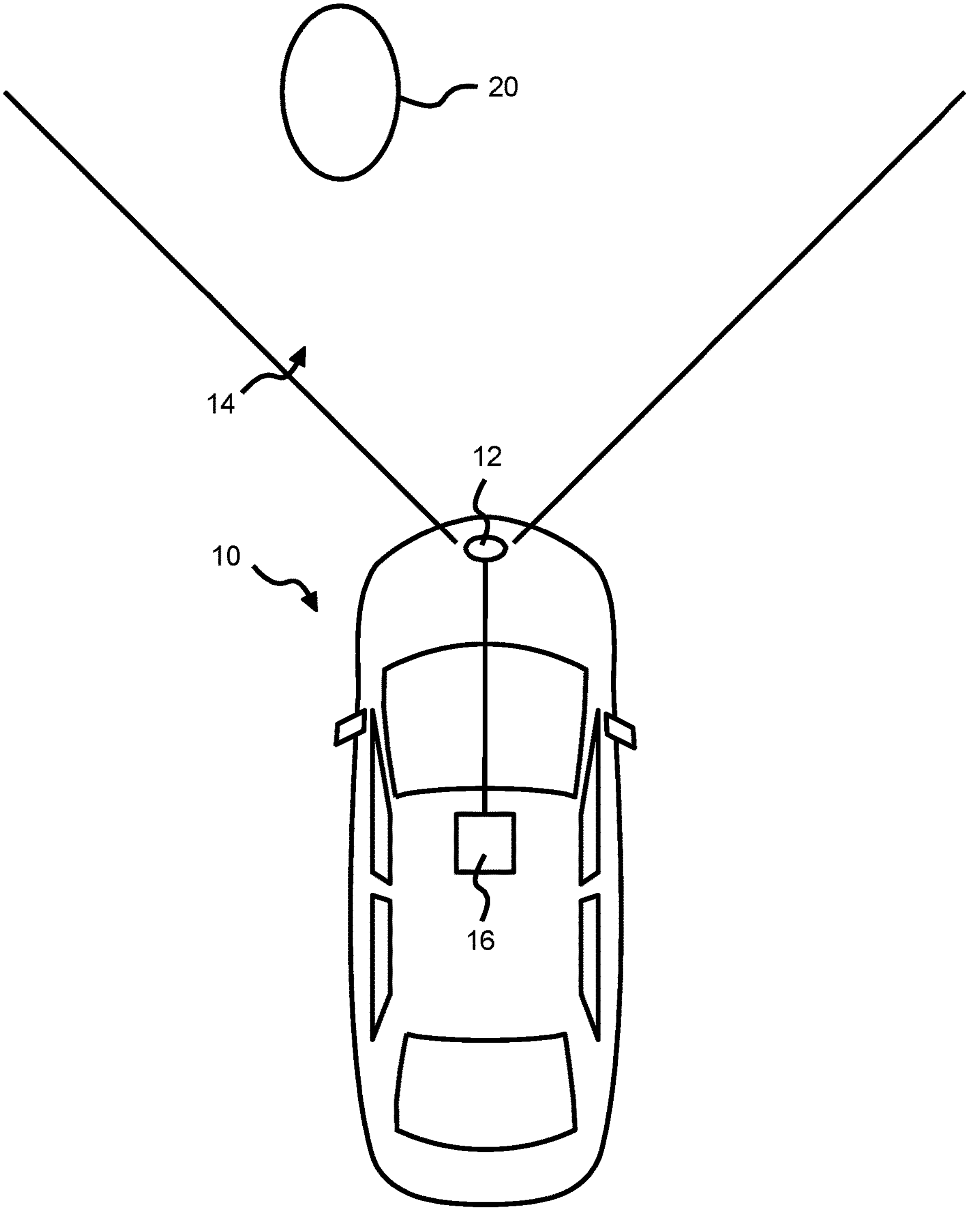
FIG. 1 is a diagram illustrating a motor vehicle during driving, according to an embodiment.

Referring to FIG. 1, an embodiment of a motor vehicle 10 is shown during driving on a road, for example. The motor vehicle 10 includes a first sensor apparatus 12. The first sensor apparatus 12 is an imaging sensor, e.g., a front camera. The first sensor apparatus 12 covers a first portion 14 of the environment around the motor vehicle 10.

The motor vehicle 10 includes a data processing apparatus 16. The first sensor apparatus 12 is operatively coupled to the data processing apparatus 14.

Figure 2:
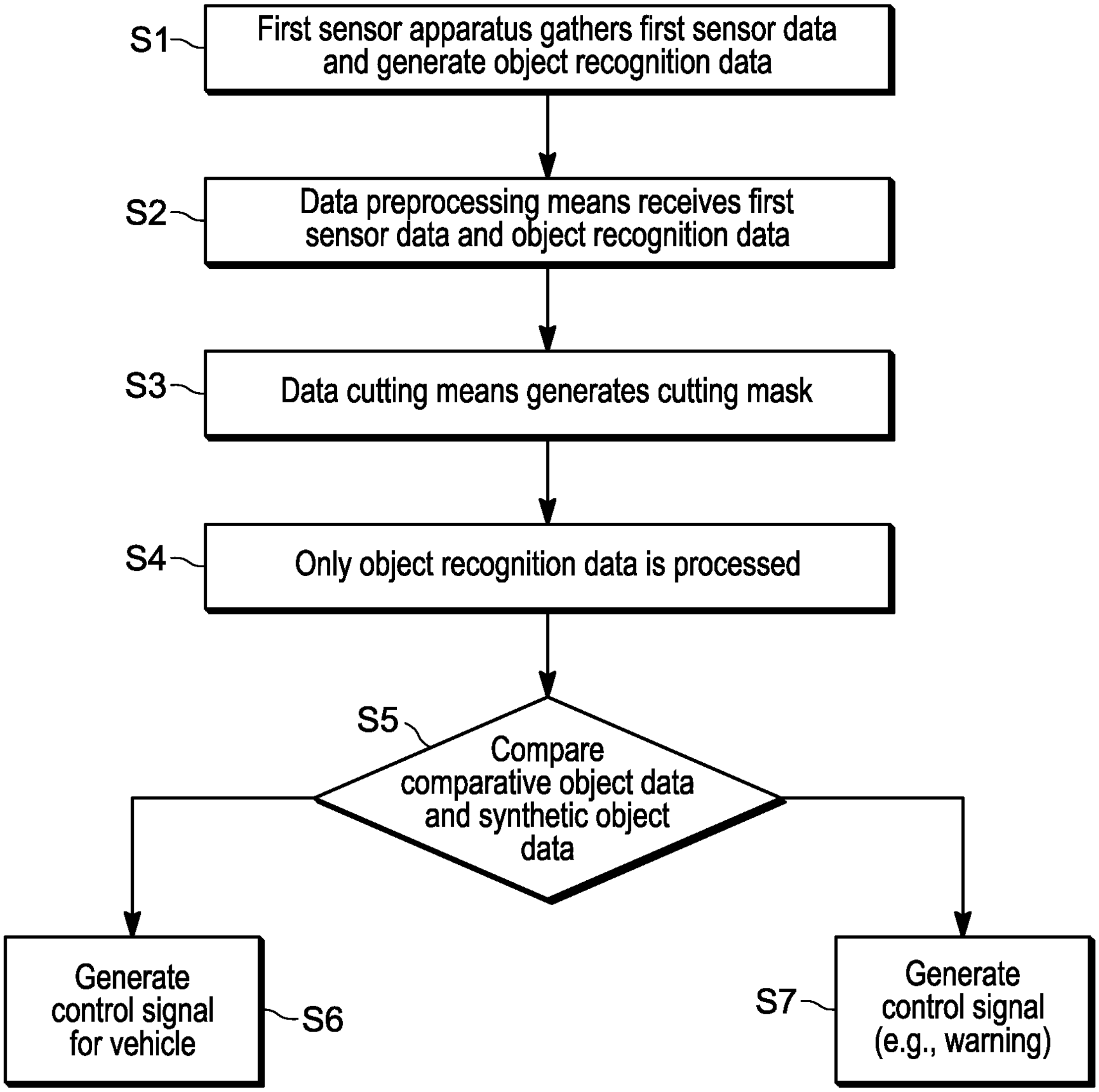
FIG. 2 is a flowchart illustrating a method of generating a control signal for a motor vehicle, according to an embodiment.

Referring to FIG. 2, in a step S1, the first sensor apparatus 12 gathers first sensor data that are indicative of an object 20 that is supposedly present in the first portion 14. The first sensor apparatus 12 performs an object recognition and generates corresponding object recognition data. The object recognition data include at least one semantic descriptor that is indicative of the object type of the object 20. In this example, the semantic descriptor includes the designation "pedestrian", for example. The first sensor data and/or the object recognition data are fed to the data processing apparatus 14.

The data processing apparatus 14 includes a plurality of means that process the data as described in more detail below.

In a step S2, a data pre-processing means receives the first sensor data and/or the object recognition data. The data pre-processing means may perform typical pre-processing tasks that are well known in the field of computer vision and are hence omitted for sake of brevity. The pre-processed first sensor data and object recognition data may be passed on to a data cutting means.

In a step S3, the data cutting means generates a cutting mask based on the object recognition data. The cutting mask is preferably adapted to the semantic descriptor, such as "pedestrian". The cutting mask therefor has a roughly human shape in this example.

The cutting mask is applied to the first sensor data to cut therefrom the object 20, e.g., a supposed pedestrian, as it is described by the object recognition data. This results in comparative object data that only include the object 20, e.g., the supposed pedestrian, as it is defined by the object recognition data and was cut from the first sensor data.

In a step S4, only the object recognition data, specifically the at least one semantic descriptor, is processed by a synthetic data generator. The synthetic data generator may include a generative adversarial network or any other model suitable to generate synthetic image data from semantic descriptors. In this example, the synthetic data generator generates synthetic object data based on the semantic descriptor, e.g., "pedestrian". The synthetic data generator may also include information from the first sensor data and/or the object recognition data that describe the perspective of the object 20.

In a step S5, the comparative object data and the synthetic object data are compared. The comparison may be performed by a machine learning model, such as a deep neural network trained for image comparison. An example for such a comparator model are Siamese networks. Other networks include self organized comparators. These types of models are known per se. If the comparison determines that the comparative object data and the synthetic object data match, i.e., are similar enough, e.g., a predetermined similarity score is exceeded, then a confirmation signal is generated that indicates that the first sensor data are valid. In this case the method proceeds to step S6.

Otherwise, a rejection signal is generated that indicates that the first sensor data are rejected from further processing. In this case the method proceeds to step S7.

In a step S6, a control means generates a control signal for the motor vehicle 10. The control signal is generated based on the confirmation signal and at least one of the first sensor data and the object recognition data. Since the first sensor data were confirmed, the control means generates the control signal accordingly. As in this example the object 20 was identified as a pedestrian, the control signal is generated to cause the motor vehicle 10 to perform a braking operation and/or steering operation. Depending on the distance, the control signal may also cause an emergency braking operation, that can be more aggressive.

In a step S7, the control means may generate a control signal, such as a warning signal or the like. Since the first sensor data could not be validated, the control means excludes the first sensor data and associated data from taking part in generating the control signal. It should be noted that the control signal may be configured to cause the motor vehicle 10 to do nothing.

Another embodiment is described in more detail only insofar as it differs from the previously described embodiment.

Figure 3:
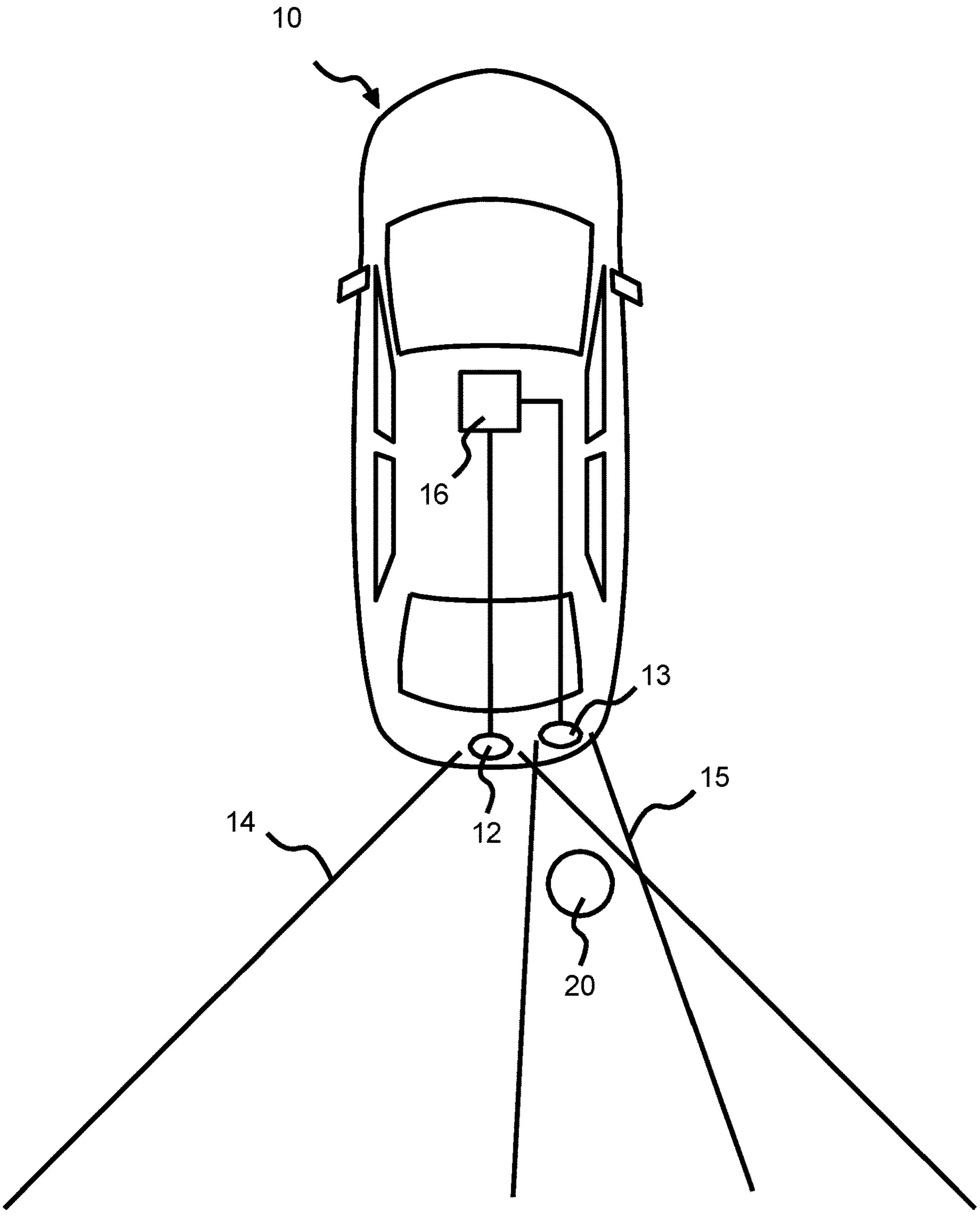
FIG. 3 is a diagram illustrating a motor vehicle during reverse parking, according to an embodiment.

Referring to FIG. 3 an embodiment of a motor vehicle 10 is shown during reverse parking, for example. The motor vehicle 10 includes additionally a second sensor apparatus 13. The second sensor apparatus 13 is a non-imaging sensor, e.g., an ultrasonic sensor. The second sensor apparatus 13 covers a second portion 15 of the environment around the motor vehicle 10 that at least partially overlaps with the first portion 14. The first and second sensor apparatus 12, 13 are of different type.

The second sensor apparatus 13 is operatively coupled to the data processing apparatus 14.

Figure 4:
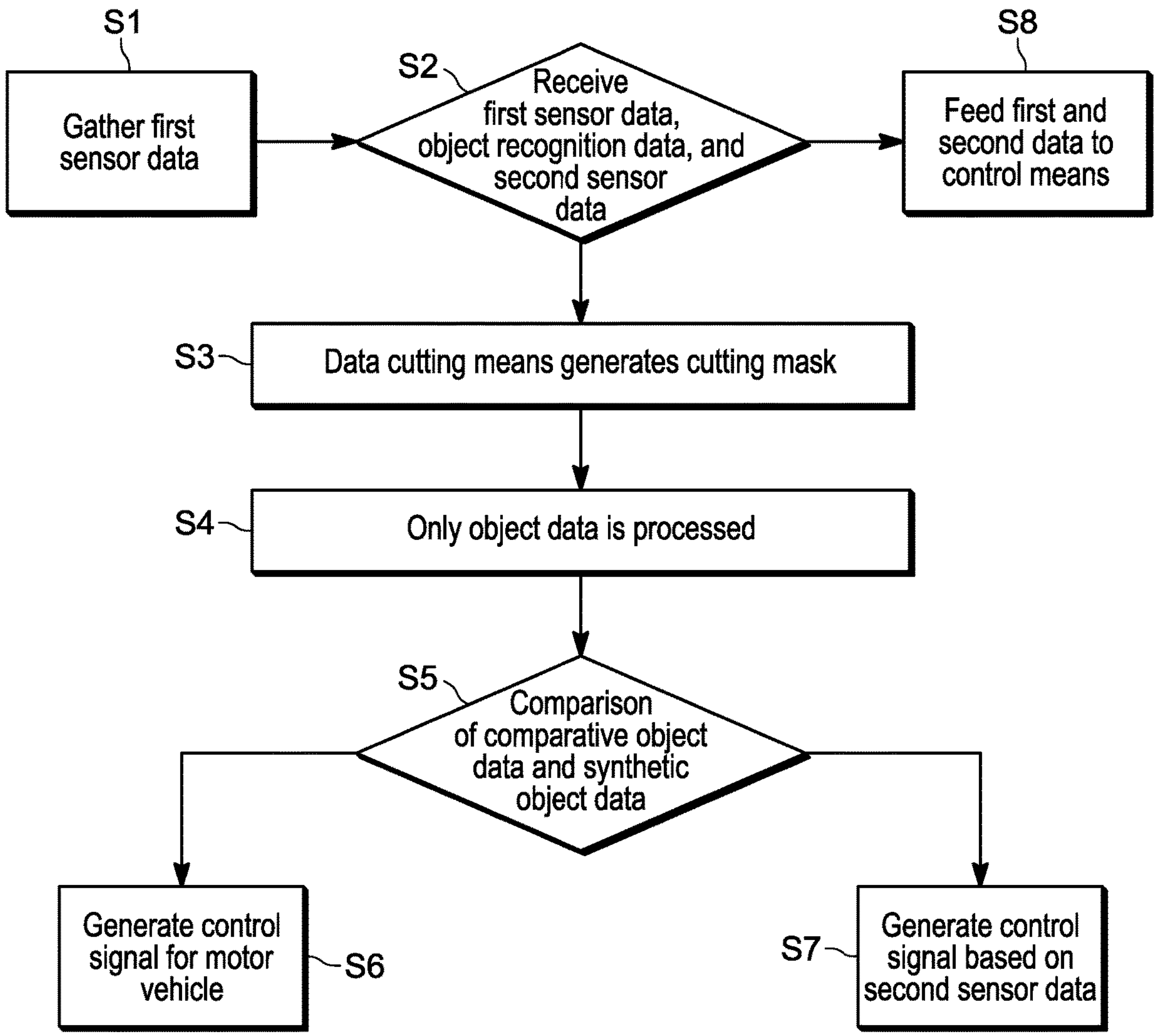
FIG. 4 is a flowchart illustrating a method for controlling a method of controlling a motor vehicle, according to an embodiment.

Referring to FIG. 4, in a step S1, the first sensor apparatus 12 gathers first sensor data that are indicative of an object 20 that is supposedly present in the first portion 14. The second sensor apparatus 13 gathers second sensor data that are indicative of the object 20 that is also supposedly present in the second portion 15.

The first sensor apparatus 12 performs an object recognition and generates corresponding object recognition data. The object recognition data include at least one semantic descriptor that is indicative of the object type of the object 20. In this example, the semantic descriptor includes the designation "obstacle", for example.

The first sensor data and/or the object recognition data, as well as the second sensor data are fed to the data processing apparatus 14.

The data processing apparatus 14 includes a plurality of means that process the data as described in more detail below.

In a step S2, a data pre-processing means receives the first sensor data and/or the object recognition data as well as the second sensor data. The data pre-processing means performs some basic analysis of the first and second sensor data in order to determine, whether the first and second sensor data are consistent. The first sensor data and/or the object recognition data indicate an object 20 that was identified as an obstacle, for example. The data pre-processing means may determine a rough location estimate of the object 20. The rough location estimate can then be used to determine whether the object 20 (or any object) is present in the second sensor data.

If it is determined that the object 20 is present in both the first and second sensor data, then the method proceeds with step S8. If, however, the data pre-processing means determines that the first and second sensor data do not match, e.g., due to the object being present in the first sensor data but not the second sensor data, the method proceeds with steps S3 to S5 as previously described.

In steps S3 to S5, the data processing means substantially performs the steps as previously described.

In step S5, if the comparison determines that the comparative object data and the synthetic object data match, then a confirmation signal is generated that indicates that the first sensor data are valid. In this case the method proceeds to step S6. Otherwise, a rejection signal is generated that indicates that the first sensor data are rejected from further processing. In this case the method proceeds to step S7.

In a step S6, a control means generates a control signal for the motor vehicle 10. The control signal is generated based on the confirmation signal and at least one of the first sensor data and the object recognition data as well as the second sensor data. Since the first sensor data were confirmed, the control means generates the control signal at least based on the first and second sensor data accordingly. As in this example the object 20 was identified as an obstacle, the control signal can be generated to cause the motor vehicle 10 to warn the driver of a possible collision. It is also possible that the control signal causes the motor vehicle 10 to perform a braking operation and/or steering for avoidance operation.

In a step S7, the control means may generate a control signal based on the second sensor data alone, since the first sensor data could not be validated. The control means excludes the first sensor data and associated data from taking part in generating the control signal. Other sensor data may be used, however. It should be noted that the control signal may be configured to cause the motor vehicle 10 to do nothing.

In a step S8, the first and second sensor data and optionally the object recognition data are fed to the control means for generating an appropriate control signal. Depending on the vehicle speed and distance of the obstacle, the control signal may cause the motor vehicle 10 to warn the driver and/or perform a braking or steering operation.

It should be noted that some variants of the method are possible that are not explicitly shown for sake of brevity. For example, the steps S3 to S5 were described in reference only to the first sensor data. It is also possible that the same steps are performed on the second sensor data.

Furthermore, while only two types of sensors were exemplified, the application is also applicable to more types of sensors and/or more sensors in general. The terms "first", "second", etc. are not supposed to indicate an amount of sensors but merely distinguish different sensors from each other. Also, the enumeration of the method steps as a), b), c) does not imply a specific sequence, but is merely there for easier reference.

In order to improve real-time false positive reduction, first and second sensor data of a potential object in a common portion of an environment of a motor vehicle are compared (S2). Upon determining that there is a discrepancy in the first and second sensor data in relation to the object, an analysis by synthesis (ABS) is performed on the first sensor data (S3 to S5). If the ABS results in a match, then the first sensor data are validated and can be used for generating a control signal for an autonomous vehicle (S7). If the ABS results in a mismatch, the first sensor data are excluded from generating the control signal (S6). In case of no discrepancy between the first and second sensor data, both are used in generating the control signal (S8). In a variant, the ABS is performed only on first sensor data independent of other sensor data.

The invention claimed is:

1. A method for avoiding or reducing false positives in a computer vision task, the method comprising:

receiving first sensor data and object recognition data generated based on the first sensor data, wherein the object recognition data is indicative at least of an object type and an object location of an object identified by the first sensor data, wherein the object type comprises at least one semantic descriptor;

generating comparative object data comprising the object defined by the object recognition data;

generating from the at least one semantic descriptor synthetic object data that correspond with the semantic descriptor;

comparing the comparative object data with the synthetic object data; and generating a confirmation signal that indicates confirmation of the validity object recognition data or a rejection signal that causes the object recognition data to be rejected from further processing based on a result of comparing the comparative object data with the synthetic object data;

receiving second sensor data from a sensor type different than a sensor type of the first sensor data;

wherein the steps of generating the synthetic object data and comparing it with the comparative object data are performed only upon a mismatch between the first and second sensor data.

2. The method according to claim 1, wherein the second sensor data comprises information about a same portion of an environment in which the object is located, and wherein the generating comprises, upon generating the rejection signal, generating a signal that causes the second sensor data to be further processed.

3. The method according to claim 2, wherein the comparing comprises comparing the first sensor data and the second sensor data.

4. The method according to claim 1, wherein the first sensor data comprises image data gathered by an imaging sensor apparatus.

5. The method according to claim 2, wherein the second sensor data comprises non-image data gathered by a non-imaging sensor apparatus.

6. A method controlling a motor vehicle, the method comprising:

obtaining first sensor data;

determining object recognition data based on the first sensor data, wherein the object recognition data is indicative at least of an object type and an object location of an object identified by the first sensor data, wherein the object type comprises at least one semantic descriptor;

generating comparative object data that comprising the object defined by the object recognition data;

generating from the at least one semantic descriptor synthetic object data that correspond with the semantic descriptor;

comparing the comparative object data with the synthetic object data;

generating a confirmation signal that indicates confirmation of the validity object recognition data or otherwise a rejection signal that causes the object recognition data to be rejected from further processing; and generating a control signal for the motor vehicle in response to receiving the confirmation signal and the object recognition data, wherein the control signal is based on the object recognition data;

receiving second sensor data from a sensor type different than a sensor type of the first sensor data wherein the steps of generating the synthetic object data and comparing it with the comparative object data are performed only upon a mismatch between the first sensor data and the second sensor data.

7. The method according to claim 6, wherein the generating comprises generating a control signal in response to receiving the rejection signal.

8. The method according to claim 6, wherein the second sensor data includes information about a same portion of an environment around the motor vehicle in which the object is located.

9. The method according to claim 8, further comprising comparing the first sensor data and second sensor data.

10. The method according to claim 8, wherein the first sensor data is image data.

11. The method according to claim 8, wherein the second sensor data is non-image data.

* * * * *